US012725406B2

(12) United States Patent
Yuan et al.

(10) Patent No.: US 12,725,406 B2
(45) Date of Patent: Sep. 1, 2026

(54) TASK-ORIENTED CLUSTERING USING PROMPT LEARNING

(71) Applicant: International Business Machines Corporation, Armonk, NY (US)

(72) Inventors: Zhong Fang Yuan, Xi'an (CN); Tong Liu, Xi'an (CN); Han Qiao Yu, Xi'an (CN); Yuhong Zou, Shanghai (CN); Xiang Yu Yang, Xi'an (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 527 days.

(21) Appl. No.: 18/330,709

(22) Filed: Jun. 7, 2023

(65) Prior Publication Data

US 2024/0412487 A1 Dec. 12, 2024

(51) Int. Cl.
*G06V 10/762* (2022.01)
*G06V 10/774* (2022.01)

(52) U.S. Cl.
CPC .......... *G06V 10/774* (2022.01); *G06V 10/762* (2022.01)

(58) Field of Classification Search
None
See application file for complete search history.

(56) References Cited

U.S. PATENT DOCUMENTS

| | | | |
|---|---|---|---|
| 10,671,936 | B2 | 6/2020 | Bouveyron et al. |
| 2015/0248476 | A1 | 9/2015 | Weissinger et al. |
| 2018/0032606 | A1 | 2/2018 | Tolman et al. |
| 2022/0365993 | A1 | 11/2022 | Voisin et al. |

(Continued)

FOREIGN PATENT DOCUMENTS

| | | | |
|---|---|---|---|
| CN | 106708969 | B | 1/2020 |
| CN | 114970523 | A | 8/2022 |

OTHER PUBLICATIONS

Cohen, Niv, and Yedid Hoshen. "Language-Guided Image Clustering." International Conference on Learning Representations. 2022. (Year: 2022).*

(Continued)

*Primary Examiner* — Sean M Conner

(74) *Attorney, Agent, or Firm* — Amin, Turocy & Watson, LLP

(57) ABSTRACT

Systems, computer-implemented methods, and computer program products to facilitate capturing relative importance of relational entities for building database embedding models are provided. According to an embodiment, a system can comprise a processor that executes components stored in memory. The computer executable components can comprise a template component that utilized natural language as a prompt template to describe a perspective of clustering and assembles description information into the prompt template to generate a base model. The computer executable components can comprise a training component that can utilize data in the prompt template to automatically build training data of an adapter to generate a final model. The computer executable components can comprise a vector generator component that inputs the prompt template to the final model to generate one or more hidden layer vectors highlighting characteristics of the natural language.

20 Claims, 11 Drawing Sheets

(56) References Cited

U.S. PATENT DOCUMENTS

2023/0065870 A1* 3/2023 Pyzow ..................... G06N 3/10

OTHER PUBLICATIONS

Gao, Peng, et al. "Clip-Adapter: Better Vision-Language Models with Feature Adapters." arXiv preprint arXiv:2110.04544 (2021). (Year: 2021).*

Laddecke, Timo, and Alexander Ecker. "Image segmentation using text and image prompts." Proceedings of the IEEE/CVF conference on computer vision and pattern recognition. 2022. (Year: 2022).*

Malladi, Sadhika, et al. "Fine-Tuning Language Models with Just Forward Passes." arXiv preprint arXiv:2305.17333 (2023). (Year: 2023).*

Ruiz, Nataniel, et al. "DreamBooth: Fine Tuning Text-to-Image Diffusion Models for Subject-Driven Generation." arXiv preprint arXiv:2208.12242 (2023). (Year: 2023).*

* cited by examiner

902 UTILIZING, BY A DEVICE OPERATIVELY COUPLED TO A PROCESSOR, NATURAL LANGUAGE AS A PROMPT TEMPLATE TO DESCRIBE A PERSPECTIVE OF CLUSTERING

904 ASSEMBLING, BY THE DEVICE, DESCRIPTION INFORMATION INTO THE PROMPT TEMPLATE TO GENERATE A BASE MODEL

906 UTILIZING, BY THE DEVICE, DATA IN THE PROMPT TEMPLATE TO AUTOMATICALLY BUILD TRAINING DATA OF AN ADAPTER TO GENERATE A FINAL MODEL

908 INPUTTING, BY THE DEVICE, THE PROMPT TEMPLATE TO THE FINAL MODEL TO GENERATE ONE OR MORE HIDDEN LAYER VECTORS HIGHLIGHTING ONE OR MORE CHARACTERISTICS OF THE NATURAL LANGUAGE

910 PERFORMING, BY THE DEVICE, A FINAL CLUSTERING VIA THE ONE OR MORE HIDDEN LAYER VECTORS

912 USING, BY THE DEVICE, THE ONE OR MORE HIDDEN LAYER VECTORS AS A FEATURE FOR THE FINAL CLUSTERING

914

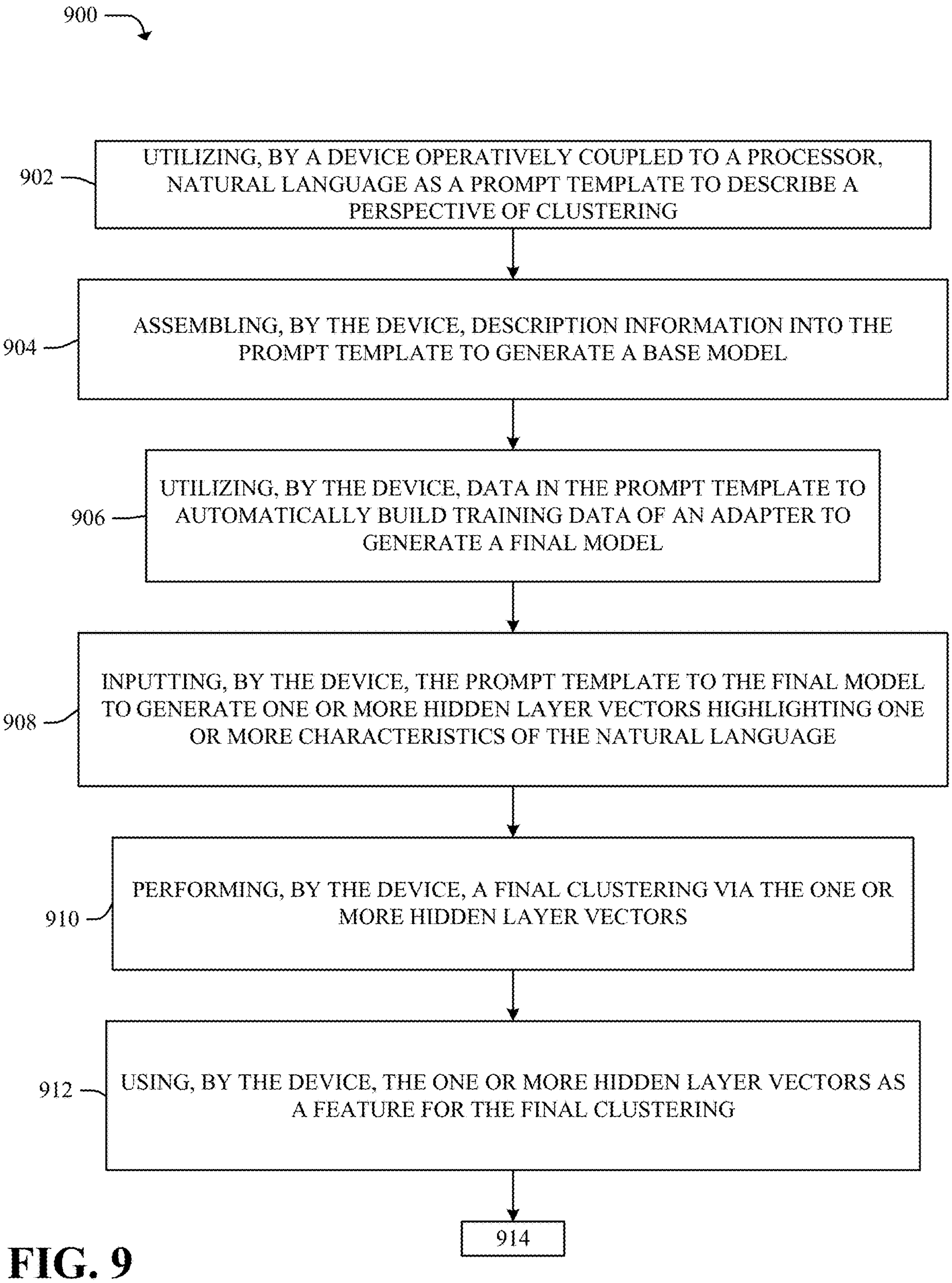

FIG. 9

TASK-ORIENTED CLUSTERING USING PROMPT LEARNING

BACKGROUND

Text clustering algorithms are commonly used for unsupervised learning of Artificial Intelligence (AI) such as in information classification of unlabeled data. Further, traditional machine learning can used characterization technology and vectorization technology to convert data into vectors and to perform unsupervised clustering on the vectorized original data. The subject disclosure relates to cross-modal clustering using prompt learning, and more specifically, to control the clustering process during clustering.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, computer-implemented methods, and/or computer program products that facilitate utilizing prompt learning to perform topic-wise clustering of data are provided.

According to an embodiment, a system can comprise a processor that executes computer executable components stored in memory. The computer executable components can comprise a template component that can utilize natural language as a prompt template to describe a perspective of clustering and can assemble description information into the prompt template to generate a base model. Additionally, the computer executable components can comprise a training component that can utilize data in the prompt template to automatically build training data of an adapter to generate a final model. The computer executable components can comprise a vector generator that can input the prompt template to the final model to generate one or more hidden layer vectors highlighting characteristics of the natural language. Further, the one or more hidden layer vectors can be used to perform a final clustering.

According to an embodiment, a computer-implemented method can comprise utilizing, by a device operatively coupled to a processor, natural language as a prompt template to describe a perspective of clustering. Additionally, the computer-implemented method can comprise assembling, by the device, description information into the prompt template to generate a base model. Further, the computer-implemented method can comprise utilizing, by the device, data in the prompt template to automatically build training data of an adapter to generate a final model. The computer-implemented method can comprise inputting, by the device, the prompt template to the final model to generate one or more hidden layer vectors highlighting one or more characteristics of the natural language. Additionally, the computer-implemented method can comprise performing, by the device, a final clustering via the one or more hidden layer vectors.

According to an embodiment, a computer program product comprising a computer readable storage medium having program instructions embodied therewith, the program instructions executable by a processor to cause the processor to utilize natural language as a prompt template to describe a perspective of clustering. The computer program product can cause the processor to assemble description information into the prompt template to generate a base model. Additionally, the computer program product can cause the processor to utilize data in the prompt template to automatically build training data of an adapter to generate a final model. According to another embodiment, the computer program product can cause the processor to input the prompt template to the final model to generate one or more hidden layer vectors highlighting one or more characteristics of the natural language. The computer program product can cause the processor to perform a final clustering via the one or more hidden layer vectors.

DESCRIPTION OF THE DRAWINGS

FIG. 9 illustrates a flow diagram of an example, non-limiting computer-implemented method that can facilitate using prompt learning to perform topic-wise clustering of data in accordance with one or more embodiments described herein.

DETAILED DESCRIPTION

Figure 1:
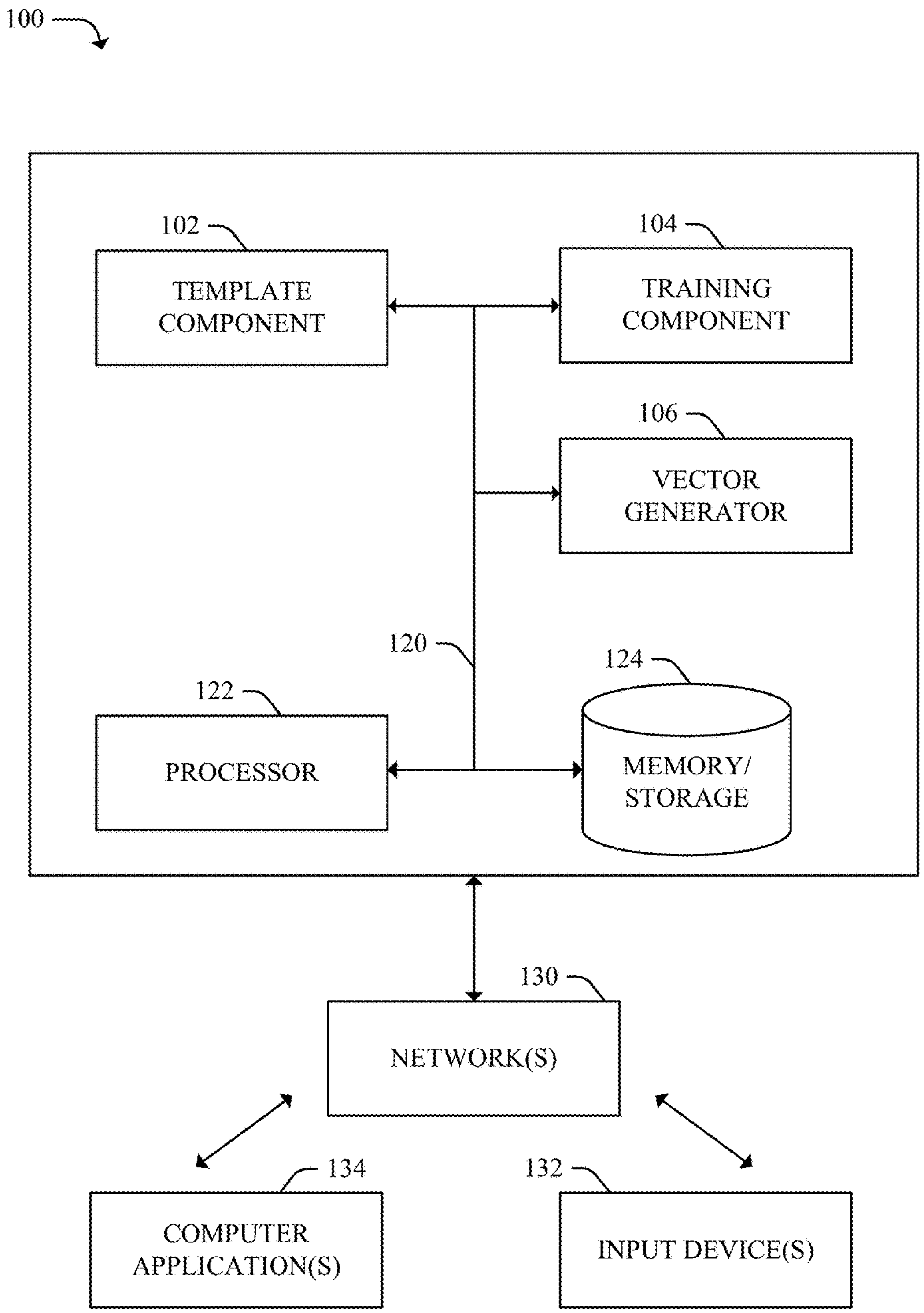
FIG. 1 illustrates a block diagram of an example, non-limiting system that can facilitate using prompt learning to perform topic-wise clustering of data in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

The exponential growth of digital data has led to an increased focus on text clustering algorithms for information classification of unlabeled data. Several notable algorithms have been developed and widely used, each with its strengths and weaknesses. Some prominent algorithms include k-means, hierarchical clustering, and density-based clustering.

K-means clustering is a popular algorithm that partitions data into a predetermined number of clusters based on their similarity. It works by iteratively optimizing the positions of cluster centroids to minimize the distance between data points and their respective centroids. However, k-means requires prior knowledge of the desired number of clusters and can be sensitive to initial centroid selection.

Hierarchical clustering is another widely used approach that constructs a tree-like structure of nested clusters. It offers a hierarchical representation of data, enabling the exploration of different levels of granularity. However, hierarchical clustering can be computationally expensive, particularly for large datasets, and suffers from scalability limitations.

Density-based clustering algorithms, such as DBSCAN (Density-Based Spatial Clustering of Applications with Noise), are effective at discovering clusters of arbitrary shape. These algorithms identify regions of high data density and separate them from less dense areas. However, density-based clustering can struggle with datasets of varying densities and suffer from sensitivity to parameter settings.

While these algorithms have made significant contributions to text clustering, they still face challenges when applied to information classification of unlabeled data. Manual labeling of data for supervised learning remains the dominant approach, which is time-consuming, expensive, and not scalable for large-scale applications. Additionally, traditional clustering algorithms often struggle to capture the semantic and contextual nuances of text data, leading to suboptimal classification results.

The present invention addresses these limitations by introducing novel text clustering algorithms/methods that leverage the power of AI, machine learning, and natural language processing techniques. By integrating these advanced methodologies, the invention aims to enhance the accuracy, efficiency, and scalability of information classification for unlabeled textual data. Given problems described above with existing text clustering algorithms, the present disclosure can be implemented to produce a solution to these problems in the form of systems, computer-implemented methods, and/or computer program products that can facilitate utilizing prompt learning to perform topic-wise clustering of data.

In some embodiments, the present disclosure can be implemented to produce a solution to the problems described above in the form of systems, computer-implemented methods, and/or computer program products that can further facilitate utilizing prompt learning to perform topic-wise clustering of data by: utilizing natural language as a prompt template to describe a perspective of clustering assembling description information into the prompt template to generate a base model; utilizing data in the prompt template to automatically build training data of an adapter to generate a final model; inputting the prompt template to the final model to generate one or more hidden layer vectors highlighting one or more characteristics of the natural language; and performing, by the device, a final clustering via the one or more hidden layer vectors.

As referenced herein, an "entity" can comprise a client, a user, a computing device, a software application, an agent, a machine learning (ML) model, an artificial intelligence (AI) model, and/or another entity.

FIG. 1 illustrates a block diagram of an example, non-limiting prompt learning clustering system 100 that comprises a user template component 102, a training component 104, and a vector generator 106. The template component 102 can utilize natural language as a prompt template to describe a perspective of clustering and can assemble description information into the prompt template to generate a base model; and the training component 104 can utilize data in the prompt template to automatically build training data of an adapter to generate a final model. The vector generator 106 can input the prompt template to the final model to generate one or more hidden layer vectors highlighting characteristics of the natural language. Further, the system 100 can use the one or more hidden layer vectors to perform a final clustering. Repetitive description of like elements employed in other embodiments described herein is omitted for sake of brevity. Aspects of systems (e.g., the prompt learning clustering system 100 and the like), apparatuses or processes in various embodiments of the present invention can constitute one or more machine-executable components embodied within one or more machines (e.g., embodied in one or more computer readable mediums (or media) associated with one or more machines). Such components, when executed by the one or more machines (e.g., computers, computing devices, virtual machines, a combination thereof, and/or the like) can cause the machines to perform the operations described.

Figure 11:
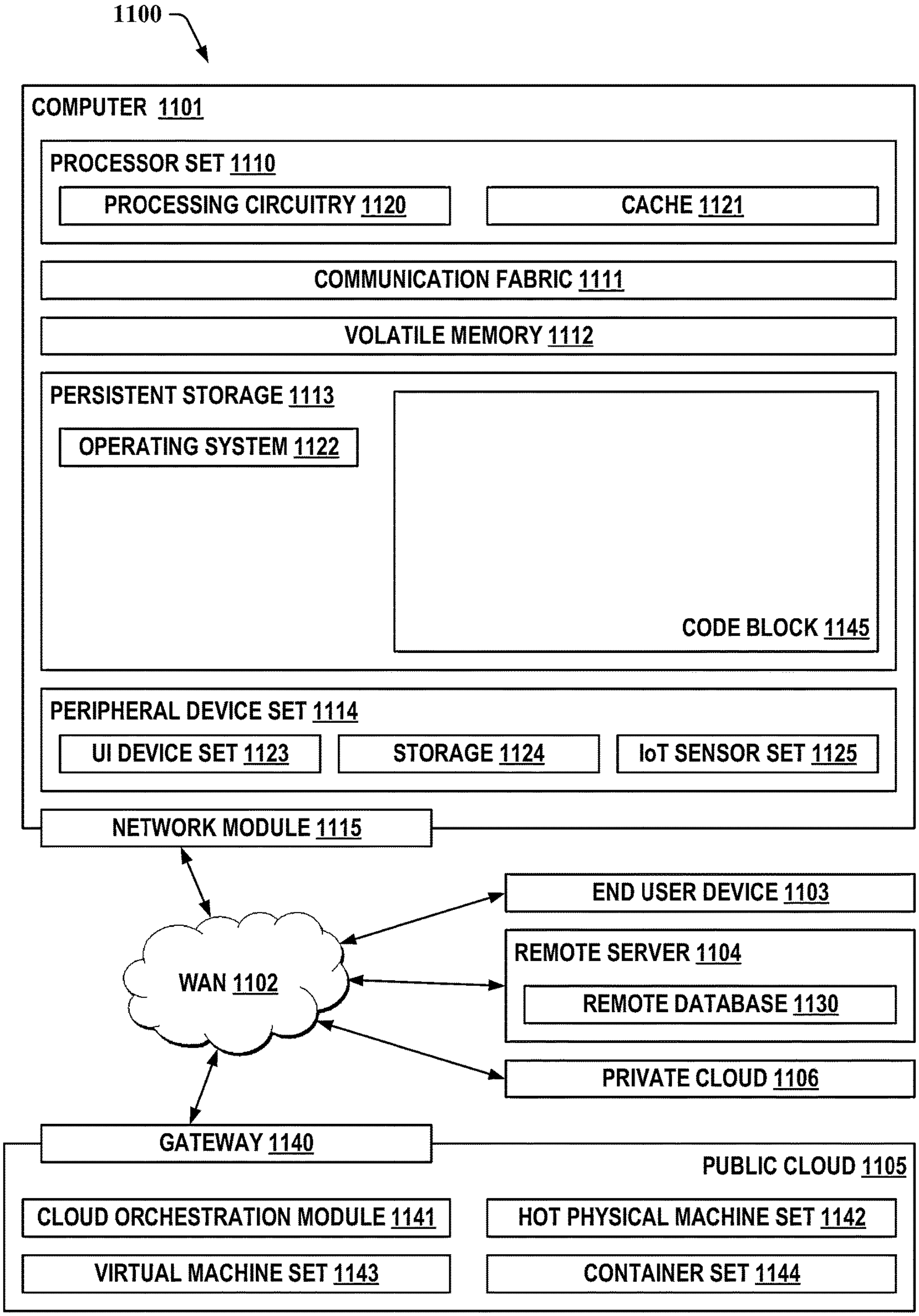
FIG. 11 illustrates a block diagram of an example, non-limiting operating environment in which one or more embodiments described herein can be facilitated.

Additional description of functionalities will be further described below with reference to the example embodiments of FIG. 1, where repetitive description of like elements and/or processes employed in respective embodiments is omitted for sake of brevity. The prompt learning clustering system 100 can facilitate: i) utilizing natural language as a prompt template to describe a perspective of clustering; ii) assembling description information into the prompt template to generate a base model; iii) utilizing data in the prompt template to automatically build training data of an adapter to generate a final model; iv) inputting the prompt template to the final model to generate one or more hidden layer vectors highlighting one or more characteristics of the natural language; and v) performing a final clustering via the one or more hidden layer vectors. Further, the template component 102, the training component 104, and the vector generator 106 can be associated with a computing environment 1100 (FIG. 11).

Discussion first turns briefly to system bus 120, processor 122, and memory 124 of prompt learning clustering system 100. For example, in one or more embodiments, the prompt learning clustering system 100 can comprise processor 122 (e.g., computer processing unit, microprocessor, classical processor, and/or like processor). In one or more embodiments, a component associated with prompt learning clustering system 100, as described herein with or without reference to the one or more figures of the one or more embodiments, can comprise one or more computer and/or machine readable, writable and/or executable components and/or instructions that can be executed by processor 122 to enable performance of one or more processes defined by such component(s) and/or instruction(s).

In one or more embodiments, prompt learning clustering system 100 can comprise a computer-readable memory (e.g., memory 124) that can be operably connected to the processor 122. Memory 124 can store computer-executable instructions that, upon execution by processor 122, can cause processor 122 and/or one or more other components of the prompt learning clustering system 100 (e.g., the template component 102, the training component 104, and the vector generator 106) to perform one or more actions. In one or more embodiments, memory 124 can store computer-executable components (e.g., the template component 102, the training component 104, and the vector generator 106).

With embodiments, prompt learning clustering system 100 and/or a component thereof as described herein, can be communicatively, electrically, operatively, optically and/or otherwise coupled to one another via bus 120. Bus 120 can comprise one or more of a memory bus, memory controller, peripheral bus, external bus, local bus, and/or another type of bus that can employ one or more bus architectures. One or more of these examples of bus 120 can be employed. In one or more embodiments, the prompt learning clustering system 100 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical computing devices, communication devices and/or like devices), such as via a network. In one or more embodiments, one or more of the components of the prompt learning clustering system 100 can reside in the cloud, and/or can reside locally in a local computing environment (e.g., at a specified location(s)). In examples, the prompt learning clustering system 100 can be connected with the bus 120, one or more input devices 132, and one or more computer applications 134, which can be associated with cloud computing environment 1100 (FIG. 11).

In addition to the processor 122 and/or memory 124 described above, the prompt learning clustering system 100 can comprise one or more computer and/or machine readable, writable and/or executable components and/or instructions that, when executed by processor 122, can enable performance of one or more operations defined by such component(s) and/or instruction(s). The prompt learning clustering system 100 can be associated with, such as accessible via, a computing environment 1100 described below with reference to FIG. 11. For example, prompt learning clustering system 100 can be associated with a computing environment 1100 such that aspects of processing can be distributed between the prompt learning clustering system 100 and the computing environment 1100.

With embodiments, topical enhancement can be used for cross-modal clustering methods using prompt learning. Further, the prompt learning clustering system 100 can use natural language as a prompt to control the clustering process. The clustering process can be controlled by the prompt so that the clustering process can be combined with one or more of a variety of specific demands (e.g., priorities or features to sort/cluster by). The clustering process can be increasingly deterministic as compared to a completely random based clustering process. Further, the natural language prompt can direct the clustering process to provide more accurate results.

Figure 2:
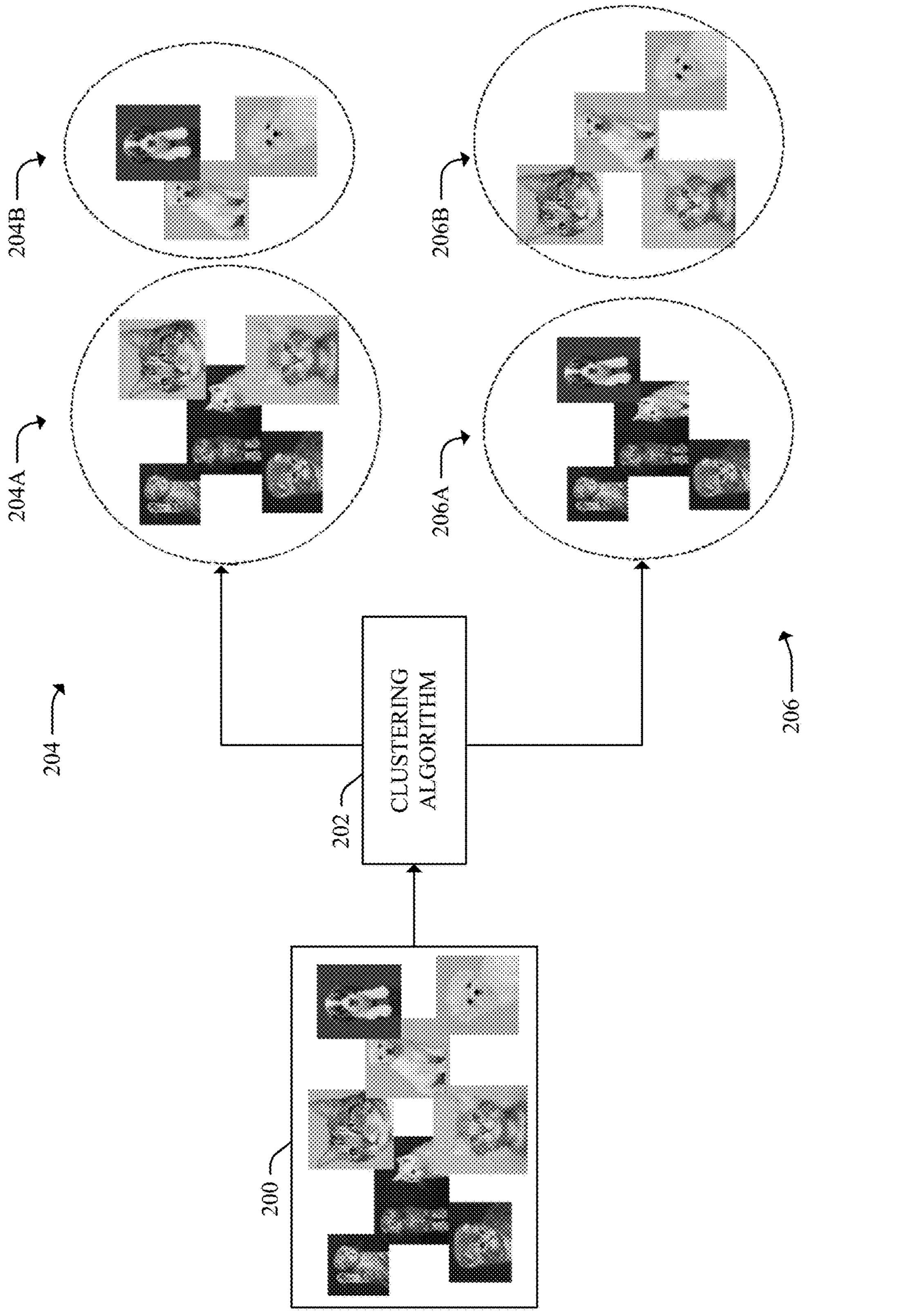
FIG. 2 illustrates a block diagram of an example, non-limiting system that can facilitate using prompt learning to perform topic-wise clustering of data in accordance with one or more embodiments described herein.

In examples, such as illustrated in FIG. 2, an original dataset 200 can be fed into a clustering algorithm 202 that can automatically classify the data into a variety of categories. For example and without limitation, the original dataset can 200 can be a collection of images of dogs and cats with varying backgrounds. The clustering algorithm 202 can be configured to sort the original dataset 200 into the categories of cats and dogs (e.g., sorting by species within the photo). For example and without limitation, the clustering algorithm 202 can generate expected/desired clustering results 204 that can be sorted into a first cluster 204A containing images of cats and a second cluster 204B containing images of dogs. However, in response to applying the clustering algorithm 202, the clustering algorithm 202 can determine that the background color is a better distinguishing factor than the image feature (e.g., species) of cats and dogs. As a result, the original dataset 200 can be sorted by background color as represented by additional clustering results 206 including a third cluster 206A of images including a first background color (e.g., red) and a fourth cluster 206B of images including a second background color (e.g., green). Further, to control the clustering process, the prompt learning clustering system 100 can integrate prompt templates with the original dataset 200 to control the clustering process.

Figure 3:
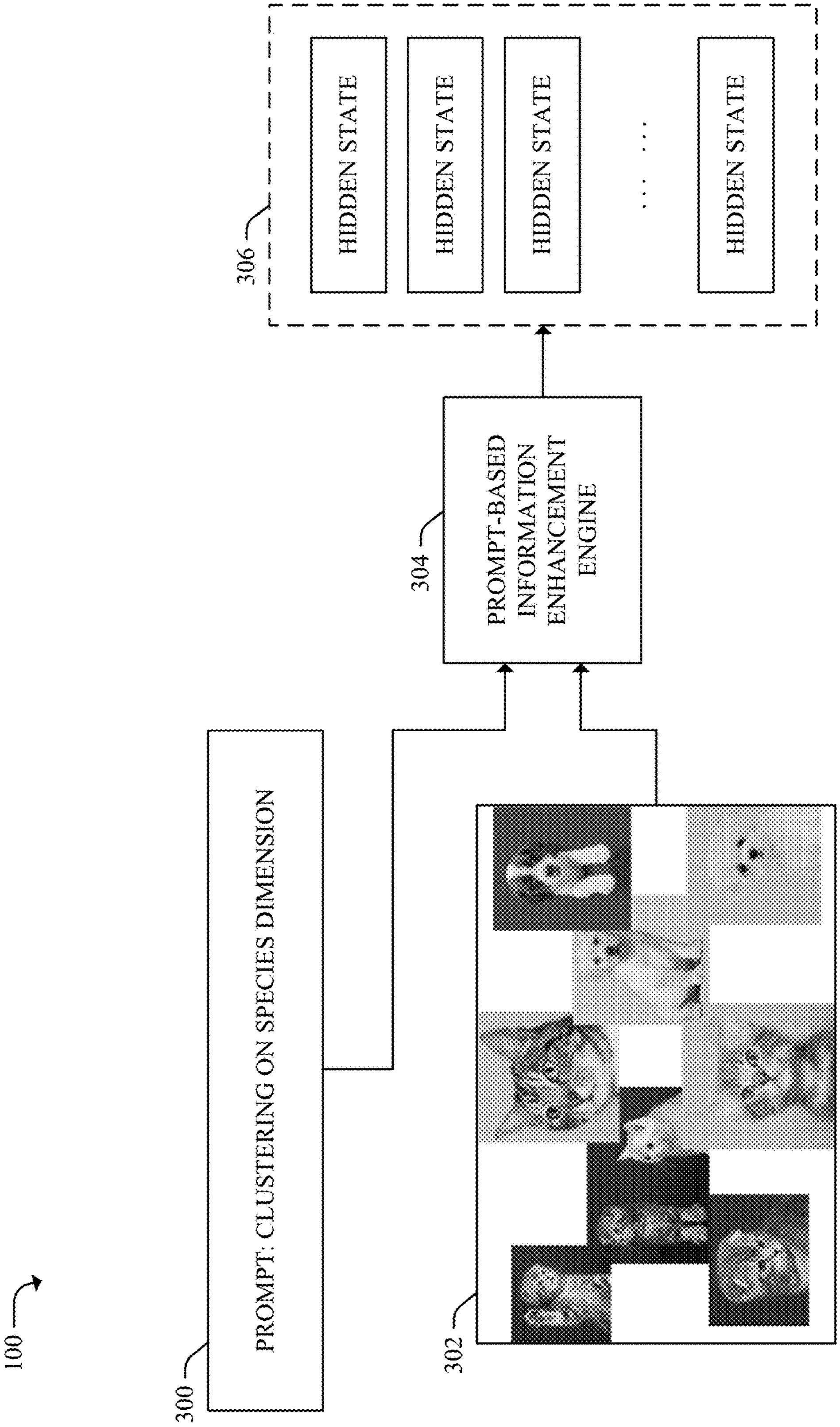
FIG. 3 illustrates a block diagram of an example, non-limiting system that can facilitate using prompt learning to perform topic-wise clustering of data in accordance with one or more embodiments described herein.
Figure 4:
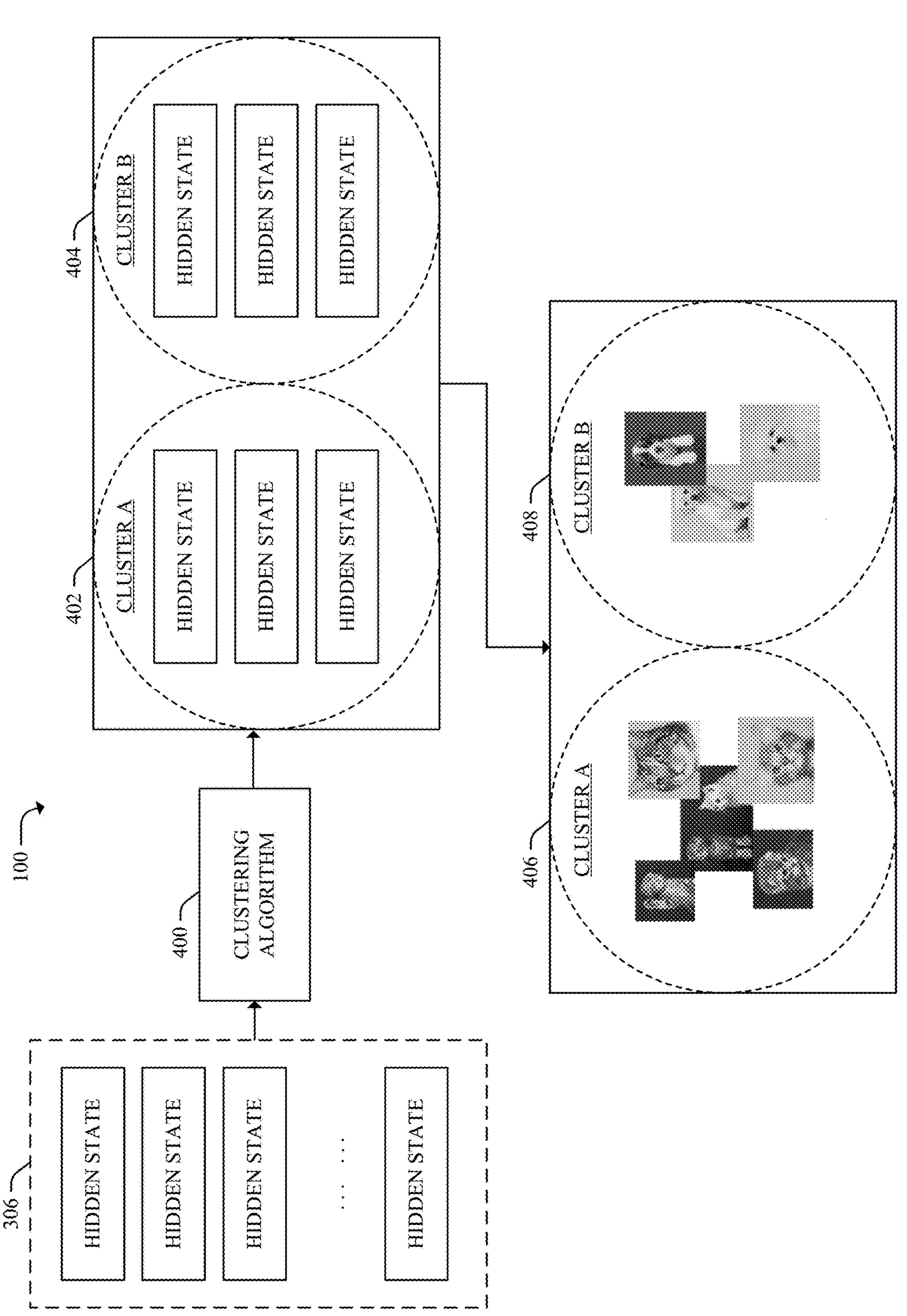
FIG. 4 illustrates a block diagram of an example, non-limiting system that can facilitate using prompt learning to perform topic-wise clustering of data in accordance with one or more embodiments described herein.

In embodiments, FIGS. 3 and 4 generally illustrate various stages of clustering via prompt learning. For example and without limitation the first stage is shown in FIG. 3, and the second state is shown in FIG. 4. The first stage can include using the prompt template 300 to describe the task and the elements of interest in the task (e.g., the task can identify the means or manner by which the user intends to sort the original image data by). Further, the first stage can include converting the original data 302 (e.g., the original image data) into one or more hidden layer vectors 306, via a prompt-based information enhancement engine 304 that can highlight the characteristics included in the prompt template 300 (as identified in the natural language via the user). The prompt-based information enhancement engine 304 (e.g., which can be included in the template component 102, the training component 104, and the vector generator 106) can be fed the prompt template 300 and the original data 302 as inputs and can output the one or more hidden layer vectors 306. The prompt-based information enhancement engine can be an encoder, which can, based on the instructions of the prompt template 300, highlight the main features of the dataset. Further, the prompt-based information enhancement engine 304 (e.g., an encoder) can convert images of the original data 302 into a hidden layer vector 306, via the vector generator 106. The final output of the encoder (e.g., the prompt-based information enhancement engine 304) can be an embedding that can be enhanced by the prompt template 300. The one or more hidden layer vectors 306 can represent the images of the original data 302 in vector space. For example, the one or more hidden layer vectors 306 can highlight a cat feature or a dog feature of the images in the original data 302, which can result in a plurality of feature enhanced hidden layer vectors 306.

With embodiments, as illustrated in FIG. 3, inputs to the system 100 can include a prompt template 300 and a set of original data 302 (e.g., a collection of images). To facilitate prompt learning, a prompt backbone model and the prompt template 300 can direct clustering of the prompt learning clustering system 100. For example and without limitation, the original data 302 can include images of cats and dogs having a variety of backgrounds. The prompt learning clustering system 100 can sort the original data into groupings of cats and dogs based on the prompt template 300 which can provide one or more of a variety of instructions and/or manner of clustering (e.g., identifying the features to sort per user/human input).

Turning next to FIG. 4, the second stage of clustering can include using the one or more hidden layer vectors 306 from the first stage to perform the final clustering. Further, according to different tasks included in the prompt template 300, the prompt learning clustering system 100 can dynamically adjust the generation of the one or more hidden layer vectors 306 in real time (e.g., via a final model). Further, the system 100 can highlight the task-related features in the original data 302 and can obtain the clustering results that meet the task-based requirements, as identified in the prompt template 300.

With embodiments, the prompt learning clustering system 100 (e.g., the template component 102, the training component 104, and the vector generator 106) can apply one or more of a variety of clustering algorithms 400 to the plurality of hidden layer vectors 306 representing the original data 302. The one or more of a variety of clustering algorithms 400 that can be applied can include K-means clustering, hierarchical clustering, DBSCAN, spectral clustering, and mean shift clustering, among others. The clustering algorithm 400 can be applied to the one or more hidden layer vectors 306 to effectively sort the original data 302 based on one or more features identified in the prompt template 300. For example and without limitation, the prompt template 300 can include instructions (e.g., natural language) to sort the original data 302 by species, where the original data 302 includes images of cats and dogs. The prompt learning clustering system 100 can convert the original data 302 into hidden layer vectors 306 that identify the various features of the original data 302 (e.g., identifying cat portions and dog portions of the original images). The prompt learning clustering system 100 can apply the clustering algorithm 400 to sort the one or more hidden layer vectors 306 into respective cluster A 402 and cluster B 404. Cluster A 402 can be a representation of the original data 302 that corresponds with the one or more hidden layer vectors 306 including a first species (e.g., dog). Cluster B can be a representation of the original data 302 that corresponds with the one or more hidden layer vectors 306 including a second species (e.g., cat).

Figure 5:
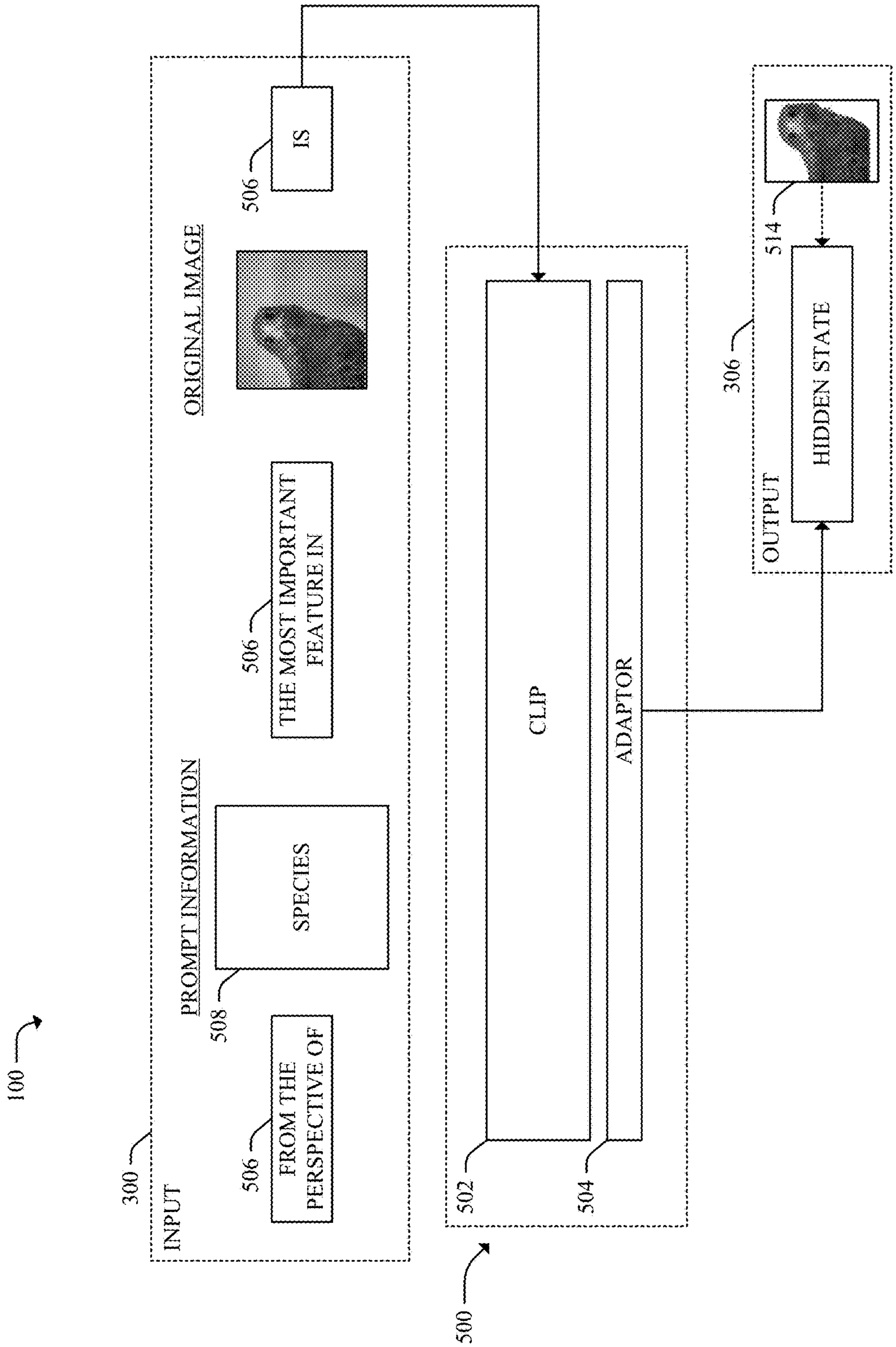
FIG. 5 illustrates a block diagram of an example, non-limiting system that can facilitate using prompt learning to perform topic-wise clustering of data in accordance with one or more embodiments described herein.

Turning next to FIG. 5, the prompt template clustering system 100 can include a base model 500 (e.g., a network) which can include a Contrastive Language-Image Pretraining (CLIP) model 502 and an adaptor 504 (e.g., which can be a shallow neural network). Further, the adaptor 504 can be external. The CLIP model 502 can be designed to understand both text and images jointly. The CLIP model 502 can enable the system 100 to learn meaningful representations of images and corresponding textual descriptions. Additionally, the CLIP model 502 can leverage a large-scale dataset (e.g., the original data 302) consisting of image-text pairs to learn a shared embedding space where similar images and text representations can be brought closer together. By jointly training on a vast amount of image and text data, the CLIP model 502 can learn to associate images with their textual descriptions and can understand the relationships between them. Such learning and training can allow the CLIP model 502 to perform a wide range of vision and language tasks, such as image classification, image captioning, and zero-shot learning.

With embodiments, such as generally shown in FIG. 5, the prompt template 300 can be an input to the base model 500 (e.g., the CLIP model 502 and the adaptor 504). The prompt template 300 can include text and images. The text can be divided into template information 506 and prompt information 508. The template information 506 can include the following text portions: "from the perspective of", "the most important feature in", and "is". The text portions of the template information can provide direction (e.g., an importance or priority for the final clustering to be performed via) for the generating the one or more hidden layer vectors 306. The template information 506 can establish the structure of the clustering to be performed via the base model 500. The prompt information 508 can include the theme of the distance between the one or more hidden layer vectors 306. In other words, the prompt information 508 can identify the information that the user desires the prompt learning clustering system 100 to pay additional attention to during clustering. Further, the prompt information 508 can be a key word that can direct and/or control the clustering process on the original data 302 for more accurate clustering results. As illustrated in FIG. 5, the prompt information 508 (e.g., the key word) can include "species" meaning that the user desires the clustering process to focus on identifying/sorting the images (e.g., the original data 302) by species. The user can specify one or more of a variety of key words to direct the clustering process. In examples, the key word can be a species, color, background, or any other portion or feature of an image. Further, the prompt template 300 can include the original image (e.g., an input).

In embodiments, the prompt learning clustering system 100 can input the prompt template 300 to the base model 500, comprised of the CLIP model 502 and the adaptor 504, to automatically generate training data 510 (e.g., via contrastive learning). Further, the adaptor 504 can be used as a task header for the CLIP model 502 where the output can be one or more hidden state vectors 306 which can be restored to one or more enhanced images 514 (e.g., an image enhanced with important information as identified by the natural language input). The adaptor 504 of the CLIP model 502 can add two additional layers after the last layer of the visual or language backbone. The prompt learning clustering system 100 can enhance or reduce images in one or more of a variety of manners. For example and without limitation, during P-tuning of the base model 500, the prompt learning clustering system 100 can reduce visual information of the original image if the natural language of the prompt template 300 directs one or more features to be ignored (e.g., from the perspective of user/human attention). In a similar manner, the prompt learning clustering system 100 can enlarge visual information of the original image if the natural langue of the prompt template 300 directs one or more features to be enhanced (e.g., from the perspective of user/human attention).

With embodiments, the base model 500 (e.g., which can be a joint model that can comprise the CLIP model 502 and adaptor 504) can be fine-tuned with a small amount of data (e.g., training data 510). Further, the fine-tuning can introduce a small number (e.g., less than about 1% of model parameters) of trainable parameters in the input space, while freezing the backbone (e.g., the base model comprising the CLIP model 502 and the adaptor 504).

In embodiments, the prompt learning clustering system 100 can utilize demonstration learning (e.g., P-tuning) to fine-tune the adaptor 504 of the base model 500 (e.g., via training data 510). The training component 104 can use natural language as a bridge to generate one or more types of data 600, 602, 604 shown in FIG. 6 corresponding to the one or more regions 606, 608, 610. Further, the training component 104 can separate the original image into either a background (e.g., region 606) or feature (e.g., regions 608 and 610) of the image via natural language annotations during P-tuning. The types of data can be representative of the one or more various elements of the original image. The training component 104 can intercept (e.g., randomly) the one or more regions 606, 608, 610 of the original image from the original data 302. Additionally, the training component 104 can use natural language annotations 612, background annotations 614, and species annotations 616, 618 to generate the training data 510. The natural language annotations 614, 616, 618 can provide structure for the training data 510 to be used for training (e.g., via demonstrative learning) the adaptor 504 over about 1-2 rounds, or more or less. Such demonstrative learning can show how the model should reason given the original data 302; and a final model 700 can be generated via the training data 510 (e.g., which can include a single piece of data).

Figure 6:
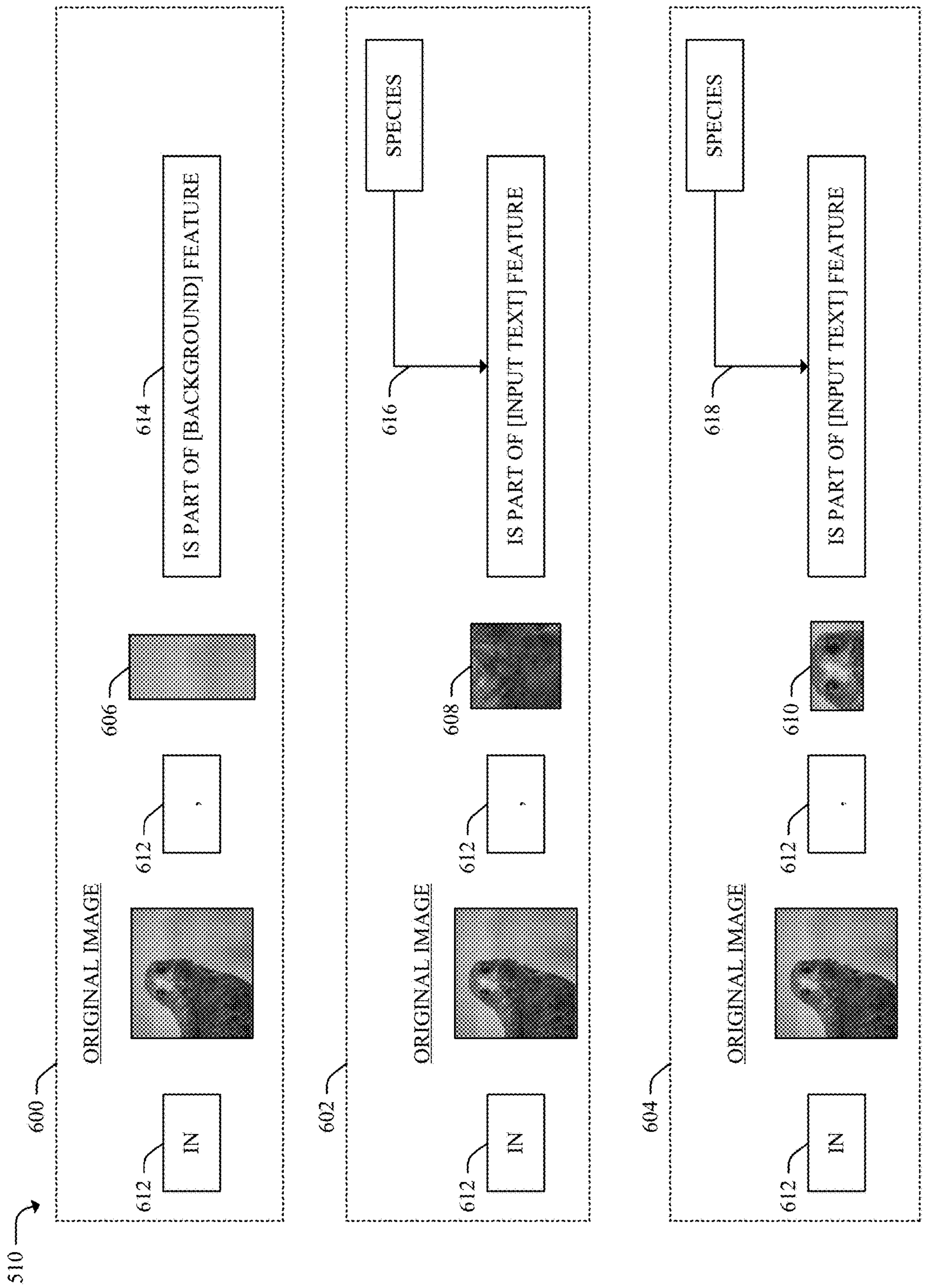
FIG. 6 illustrates a block diagram of an example, non-limiting system that can facilitate using prompt learning to perform topic-wise clustering of data in accordance with one or more embodiments described herein.

Such as illustrated in FIG. 6, the prompt learning clustering system 100 can separate the original image from the original data 302 into a first data type 600, a second data type 602, and a third data type 604 (e.g., automatically). The first data type 600 can include the background region 606 that corresponds with a background feature, the second data type 602 can include the first species region 608 that corresponds with a first species feature of the original image, and the third data type 604 can include the second species region 610 that corresponds with a second species feature of the original image. For example, the original image can include a bird (as seen in FIG. 6) and the prompt learning clustering system 100 can identify the background feature of the original image as landscape. The prompt learning clustering system 100 (e.g., template component 102, the training component 104, and the vector generator 106) can identify a body portion and a head portion of the bird as a species features.

Figure 7:
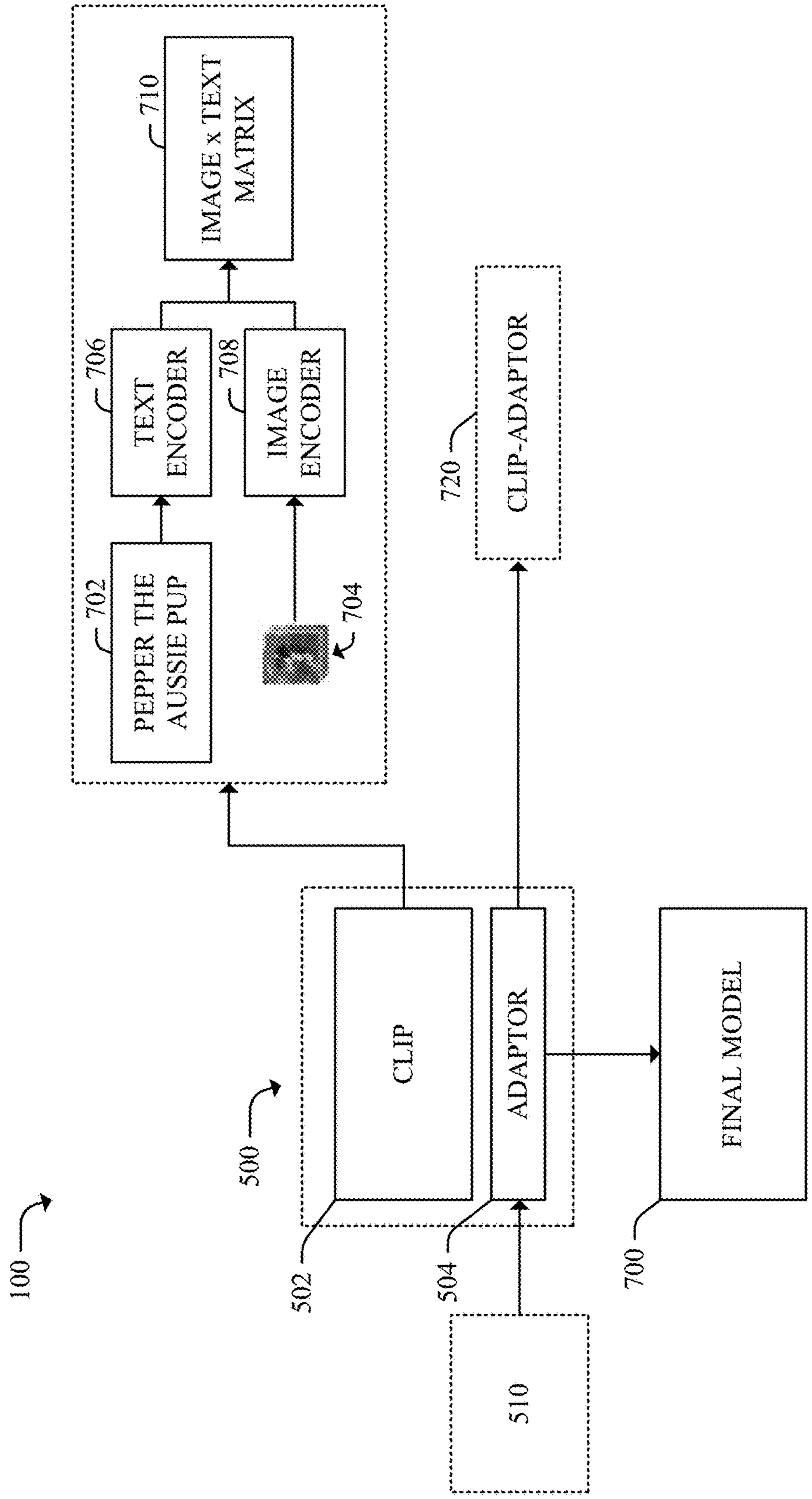
FIG. 7 illustrates a block diagram of an example, non-limiting system that can facilitate using prompt learning to perform topic-wise clustering of data in accordance with one or more embodiments described herein.

Turning to FIG. 7, the non-limiting prompt learning clustering system 100 can generate training data 510 which can be used to establish/train the adaptor 504 to generate the final model 700 over about 1-2 rounds, or more or less, of training on the adaptor 504. The CLIP model 502 can include and/or be trained with text 702 and image 704 pairs via a text encoder 706 and image encoder 708 to generate an image by text matrix 710. The CLIP model 502 can include the text encoder 706 and the image encoder 708 to facilitate image-searching text or text-searching images (e.g., via contrastive learning). The CLIP model 502 can build a match between the text 702 and image 704 and can further be trained for matching image to text and vice versa. The CLIP model 502 can search an image by the natural language received via the prompt template 300. Further, the adaptor 504 can include clip-adaptor training 720 via the training data 510. The base model 500 when trained with the training data 510 can generate the final model 700 (e.g., which can be used to generate the one or more hidden state vectors 306.

Figure 8:
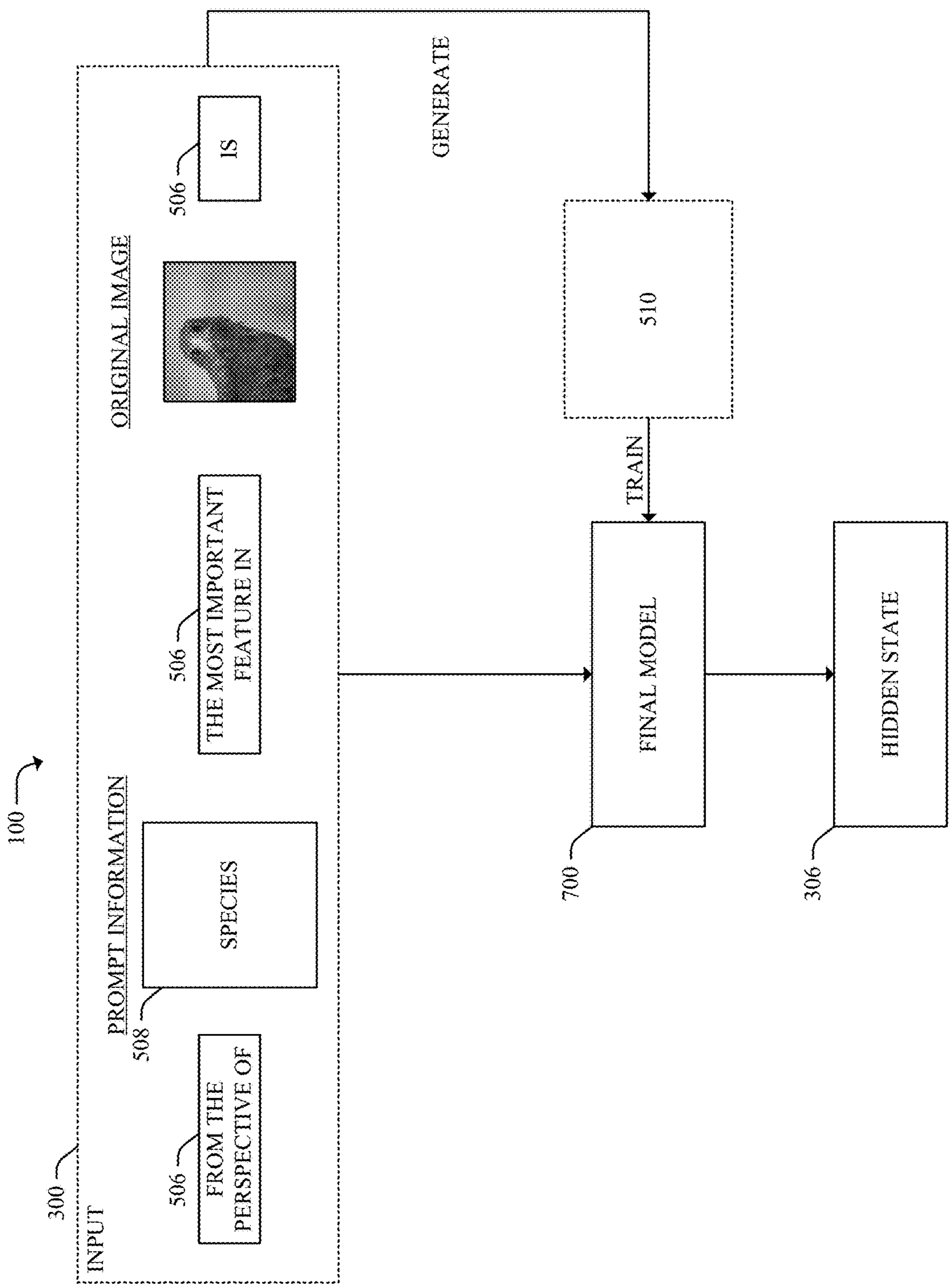
FIG. 8 illustrates a block diagram of an example, non-limiting system that can facilitate using prompt learning to perform topic-wise clustering of data in accordance with one or more embodiments described herein.

In embodiments, such as generally illustrated in FIG. 8, the prompt learning clustering system 100 can use the form of prompt text to describe the perspective of clustering and can assemble the description information into a predefined prompt template 300, which can be input into the final model 700 to generate one or more hidden state vectors 306 (e.g., a vector representing the most important feature from the perspective included in the prompt template, as partially supplied by the user). Such as shown in FIG. 4, the one or more hidden state vectors 306 can be used to perform the final clustering (e.g., which can be one or more of a variety of traditional clustering methods) via clustering algorithm 400 (e.g., via K-means clustering, DBSCAN, etc.).

Figure 10:
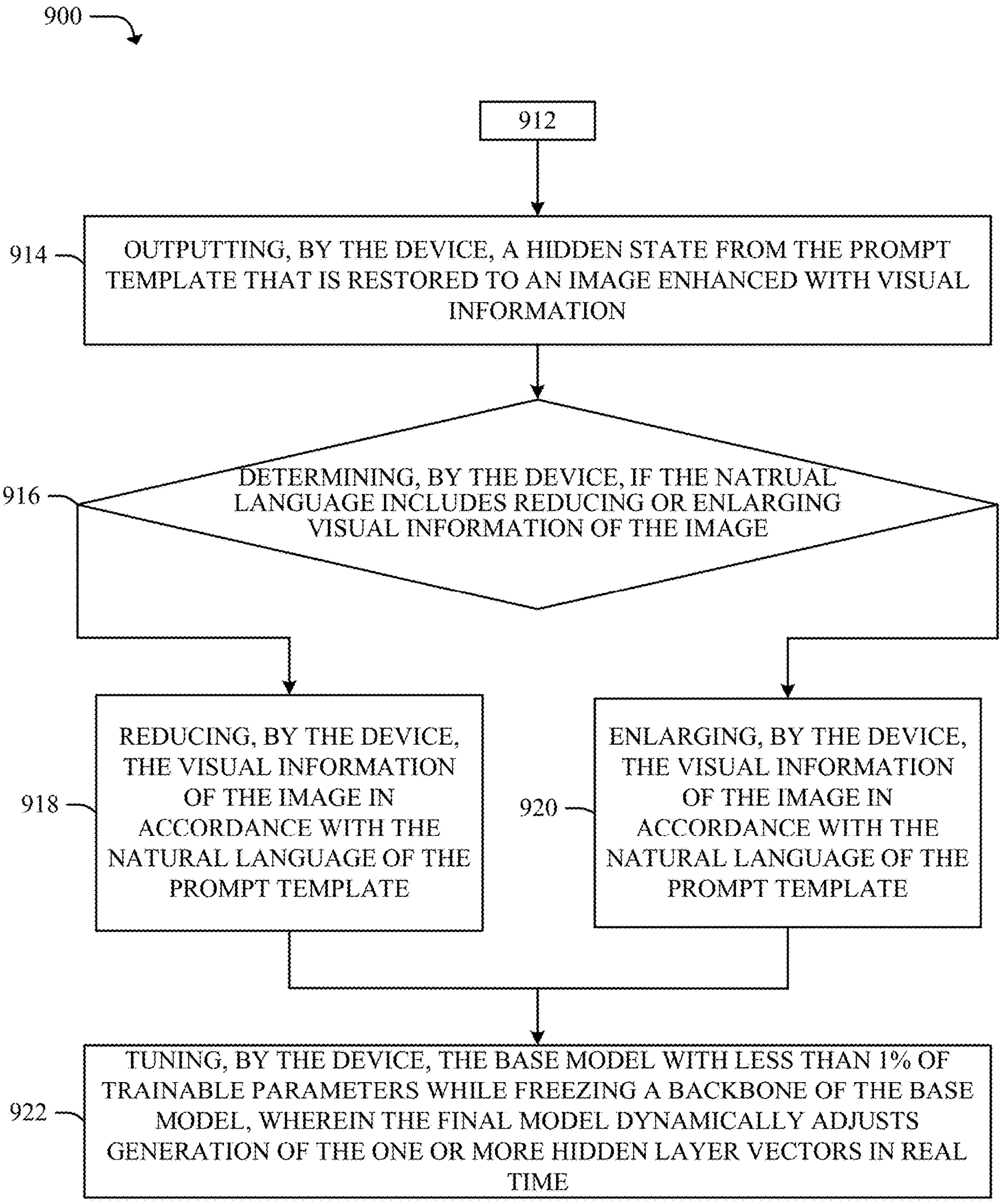
FIG. 10 illustrates a continued flow diagram of an example, non-limiting computer-implemented method that can facilitate using prompt learning to perform topic-wise clustering of data in accordance with one or more embodiments described herein.

With embodiments, FIGS. 9 and 10 illustrate flow diagrams of an example, non-limiting computer-implemented method 900 that can facilitate utilizing prompt learning to perform topic-wise clustering of data in accordance with one or more embodiments described herein. Repetitive descriptions of like elements and/or processes employed in respective embodiments is omitted for sake of brevity.

At 902, the computer-implemented method 900 can comprise, utilizing, by a device (e.g., the template component 102, the training component 104, and the vector generator 106) operatively coupled to a processor, natural language as a prompt template 300 to describe a perspective of clustering. The natural language can include one or more features that the user desires to focus the clustering operations on.

At 904, the computer-implemented method 900 can comprise assembling, by the device (e.g., the template component 102, the training component 104, and the vector generator 106), description information into the prompt template 300 to generate a base model 500. The base model 500 can include the CLIP model 502 and the adaptor 504.

At 906, the computer-implemented method 900 can comprise utilizing, by the device (e.g., the template component 102, the training component 104, and the vector generator 106), data in the prompt template to automatically build training data 510 of an adapter 504 to generate a final model.

At 908, the computer-implemented method 900 can comprise inputting, by the device (e.g., the template component 102, the training component 104, and the vector generator 106), the prompt template 300 to the final model 700 to generate one or more hidden layer vectors 306 highlighting one or more characteristics of the natural language.

At 910, the computer-implemented method 900 can comprise performing, by the device (e.g., the template component 102, the training component 104, and the vector generator 106), a final clustering via the one or more hidden layer vectors 306.

At 912, the computer-implemented method 900 can comprise using, by the device (e.g., the template component 102, the training component 104, and the vector generator 106), the one or more hidden layer vectors 306 as a feature for the final clustering.

At 914, the computer-implemented method 900 can comprise outputting, by the device (e.g., the template component 102, the training component 104, and the vector generator 106), a hidden state from the prompt template 300 that is restored to an image enhanced with visual information.

At 916, the computer implemented method 900 can comprise determining, by the device (e.g., the template component 102, the training component 104, and the vector generator 106), for each hidden layer vector of the one or more hidden layer vectors, if the natural language includes reducing or enlarging visual information of the image.

At 918, the computer implemented method 900 can comprise reducing, by the device (e.g., the template component 102, the training component 104, and the vector generator 106), the visual information of the image in accordance with the natural language of the prompt template 300.

At 920, the computer implemented method 900 can comprise enlarging, by the device (e.g., the template component 102, the training component 104, and the vector generator 106), the visual information of the image in accordance with the natural language of the prompt template 300.

At 922, the computer implemented method 900 can comprise tuning, by the device (e.g., the template component 102, the training component 104, and the vector generator 106), the base model with less than 1% of trainable parameters while freezing a backbone of the base model, wherein the final model 700 can dynamically adjust generation of the one or more hidden layer vectors 306 in real time.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively mitigate the prorogation of errors from the generative stage to the parser training stage as the one or more embodiments described herein can enable this process. And, neither can the human mind nor a human with pen and paper mitigate the propagation of errors from the generative stage to the parser training stage, as conducted by one or more embodiments described herein.

FIG. 11 illustrates a block diagram of an example, non-limiting operating environment 1100 in which one or more embodiments described herein can be facilitated. FIG. 11 and the following discussion are intended to provide a general description of a suitable operating environment 1100 in which one or more embodiments described herein at FIGS. 1-10 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 1100 contains an example of an environment for the execution of at least some of the computer code involved in performing the inventive methods, such as prompt learning clustering code 1145. In addition to block 1145, computing environment 1100 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1145, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 11. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1145 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of non-volatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1145 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general-purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function. In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented at least partially in parallel with one or more other program modules. Generally, program modules include routines, programs, components and/or data structures that perform particular tasks and/or implement particular abstract data types. Moreover, the aforedescribed computer-implemented methods can be practiced with other computer system configurations, including single-processor and/or multiprocessor computer systems, mini-computing devices, mainframe computers, as well as computers, hand-held computing devices (e.g., PDA, phone), and/or microprocessor-based or programmable consumer and/or industrial electronics. The illustrated aspects can also be practiced in distributed computing environments in which tasks are performed by remote processing devices that are linked through a communications network. However, one or more, if not all aspects of the one or more embodiments described herein can be practiced on stand-alone computers. In a distributed computing environment, program modules can be located in both local and remote memory storage devices.

As used in this application, the terms "component," "system," "platform" and/or "interface" can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random-access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the various embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:

a processor that executes computer-executable components stored in a non-transitory computer-readable memory, wherein the computer-executable components comprise:

a template component that utilizes natural language as a prompt template to describe a perspective of clustering, and assembles description information into the prompt template to generate a base model that defines a clustering objective expressed in natural language;

a training component that utilizes data in the prompt template to automatically build training data derived from the prompt template itself, generating a final model by training an adapter of the base model using the automatically-built training data, without requiring externally labeled clustering, wherein the adapter comprises a neural network; and a vector generator component that inputs the prompt template to the final model after the adapter training to generate one or more latent vectors from an intermediate representation of the final model highlighting characteristics of the natural language, wherein the one or more latent vectors are used to perform a final clustering in latent space based on the clustering objective defined by the prompt template.

2. The system of claim 1, wherein the latent vectors comprise one or more hidden layer vectors generated by an intermediate layer of the neural network, and the one or more hidden layer vectors are used as a highlighted feature by the prompt template for the final clustering.

3. The system of claim 2, wherein the prompt template outputs a hidden state that is restored to an image enhanced with visual information.

4. The system of claim 3, wherein the hidden state reduces the visual information of the image in accordance with the natural language of the prompt template.

5. The system of claim 4, wherein the prompt template enlarges the visual information of the image in accordance with the natural language of the prompt template.

6. The system of claim 1, wherein the training component fine-tunes the base model with less than 1% of trainable parameters while freezing a backbone of the base model.

7. The system of claim 2, wherein the final model dynamically adjusts generation of the one or more hidden layer vectors in real time.

8. A computer implemented method for utilizing prompt learning to perform topic-wise clustering of data, the computer implemented method comprising:

utilizing, by a device operatively coupled to a processor, natural language as a prompt template to describe a perspective of clustering by encoding semantic distinctions associated with a plurality of topics;

assembling, by the device, description information into the prompt template to generate a base model configured to respond to variations in the prompt template;

utilizing, by the device, data in the prompt template to automatically build training data derived from the prompt template itself;

generating a final model by training an adapter of the base model using the automatically-built training data, without relying on externally annotated topic labels to adapt the base model for topic-wise differentiation, wherein the adapter comprises a neural network;

inputting, by the device, the prompt template to the final model after the adapter training to generate one or more intermediate representations comprising vectors highlighting one or more characteristics of the natural language associated with respective topics; and performing, by the device, a final clustering in latent space by grouping data based on similarities among the vectors highlighting the one or more characteristics of the natural language.

9. The computer implemented method of claim 8, further comprising: using, by the device, latent vectors that comprise one or more hidden layer vectors generated by an intermediate layer of the neural network, and using the one or more hidden layer vectors as a highlighted feature by the prompt template for the final clustering.

10. The computer implemented method of claim 9, further comprising: outputting, by the device, a hidden state from the prompt template that is restored to an image enhanced with visual information.

11. The computer implemented method of claim 10, further comprising: reducing, by the device, the visual information of the image in accordance with the natural language of the prompt template.

12. The computer implemented method of claim 11, further comprising: enlarging, by the device, the visual information of the image in accordance with the natural language of the prompt template.

13. The computer implemented method of claim 9, further comprising: tuning, by the device, the base model with less than 1% of trainable parameters while freezing a backbone of the base model, wherein the final model dynamically adjusts generation of the one or more hidden layer vectors in real time.

14. A computer program product for utilizing prompt learning to perform topic-wise clustering of data, the computer program product comprising a non-transitory computer readable memory having program instructions embodied therewith, the program instructions executable by a processor to cause the processor to:

utilize natural language as a prompt template to describe a perspective of clustering by encoding topic-related semantic distinctions within the prompt template;

assemble description information into the prompt template to generate a base model responsive to semantic variation in the prompt template;

utilize data in the prompt template to automatically build training data derived from the prompt template itself;

generating a final model by training an adapter of the base model using the automatically-built training data, without reliance on externally labeled topic data to adapt the base model for topic-wise clustering, wherein the adapter comprises a neural network;

input the prompt template to the final model after the adapter training to generate one or more hidden layer vectors highlighting one or more topic-dependent characteristics of the natural language; and perform a final clustering in latent space by grouping data based on similarities among the one or more hidden layer vectors highlighting the one or more topic-dependent characteristics.

15. The computer program product of claim 14, wherein the program instructions are further executable to cause the processor to: utilize the one or more hidden layer vectors as a highlighted feature by the prompt template for the final clustering.

16. The computer program product of claim 15, wherein the program instructions are further executable to cause the processor to: output a hidden state that is restored to an image enhanced with visual information.

17. The computer program product of claim 16, wherein the program instructions are further executable to cause the processor to: reduce the visual information of the image in accordance with the natural language of the prompt template.

18. The computer program product of claim 17, wherein the program instructions are further executable to cause the processor to: enlarge visual information of the image in accordance with the natural language of the prompt template.

19. The computer program product of claim 14, wherein the program instructions are further executable to cause the processor to: tune the base model with less than 1% of trainable parameters while freezing a backbone of the base model.

20. The computer program product of claim 14, wherein the program instructions are further executable to cause the processor to: dynamically adjust generation of the one or more hidden layer vectors in real time via the final model.

* * * * *